(12) United States Patent
Tachibana

(10) Patent No.: US 10,182,348 B2
(45) Date of Patent: Jan. 15, 2019

(54) DEVICE AND METHOD FOR COMMUNICATION PARAMETER PROCESSING

(71) Applicant: CANON KABUSHIKI KAISHA, Tokyo (JP)

(72) Inventor: Hideaki Tachibana, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/396,257

(22) Filed: Dec. 30, 2016

(65) Prior Publication Data

US 2017/0215066 A1    Jul. 27, 2017

(30) Foreign Application Priority Data

Jan. 26, 2016  (JP) ................. 2016-012866

(51) Int. Cl.
| H04W 12/04 | (2009.01) |
| H04W 12/08 | (2009.01) |
| H04W 72/00 | (2009.01) |
| H04W 84/12 | (2009.01) |

(52) U.S. Cl.
CPC ........... *H04W 12/04* (2013.01); *H04W 12/08* (2013.01); *H04W 72/005* (2013.01); *H04W 84/12* (2013.01)

(58) Field of Classification Search
CPC ... H04W 12/04; H04W 12/08; H04W 72/005; H04W 84/12; H04W 12/02; H04L 63/0428; H04L 63/06
See application file for complete search history.

(56) References Cited

U.S. PATENT DOCUMENTS

| 2006/0208088 | A1* | 9/2006 | Sekiguchi | G06K 7/1095 235/472.02 |
| 2013/0223279 | A1* | 8/2013 | Tinnakornsrisuphap | H04L 41/0809 370/254 |
| 2014/0079099 | A1* | 3/2014 | Nishikawa | H04L 1/0003 375/219 |
| 2014/0351589 | A1* | 11/2014 | Chenna | H04L 63/0823 713/168 |
| 2015/0026779 | A1* | 1/2015 | Ilsar | H04W 12/06 726/5 |
| 2015/0172061 | A1* | 6/2015 | Lee | H04W 12/04 713/176 |
| 2015/0229475 | A1* | 8/2015 | Benoit | H04L 9/14 713/168 |
| 2016/0219648 | A1* | 7/2016 | Awoniyi-Oteri | H04W 8/205 |

FOREIGN PATENT DOCUMENTS

JP            2006-261938 A        9/2006

* cited by examiner

*Primary Examiner* — Ian N Moore
*Assistant Examiner* — Latresa A McCallum
(74) *Attorney, Agent, or Firm* — Canon USA, Inc., IP Division

(57) ABSTRACT

A communication device transmits a communication parameter to connect to a wireless network established by an access point to another communication device using information obtained from a captured image and stores the information obtained from the captured image. When the communication parameter is changed, the changed communication parameter is transmitted to the another communication device by reusing the stored information.

23 Claims, 8 Drawing Sheets

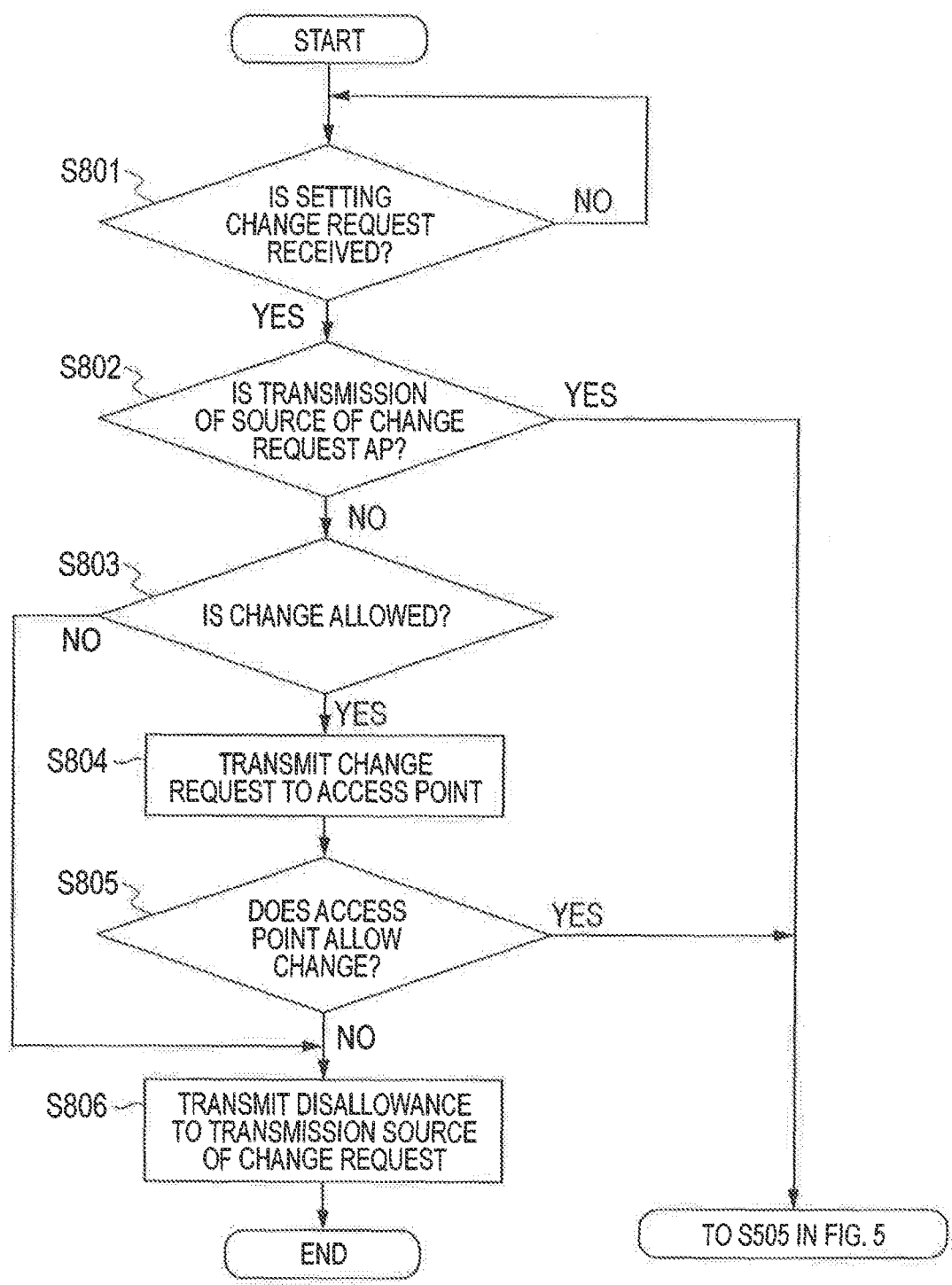

DEVICE AND METHOD FOR COMMUNICATION PARAMETER PROCESSING

BACKGROUND

Field

The present disclosure relates to a communication technology.

Description of the Related Art

Recently, there have been an increase in communication devices, such as digital cameras, printers, smartphones, cell phones, etc., including a wireless communication function. These devices are used to connect to wireless networks.

To connect these communication devices to a wireless network, various communication parameters, such as an encryption scheme, an encryption key, an authentication scheme, an authentication key, etc., need to be set in the communication devices. A technique to set these communication parameters is disclosed in Japanese Patent Laid-Open No. 2006-261938. According to Japanese Patent Laid-Open No. 2006-261938, a communication parameter generated by an access point encoded in a two-dimensional code that is displayed by the access point. A mobile terminal captures the image of the displayed two-dimensional code and sets a communication parameter that it will use by decoding the captured two-dimensional code.

As described in Japanese Patent. Laid-Open No. 2006-261938, since the communication parameter can be set by capturing the image of the two-dimensional code, user's complicated input operation can be reduced and the communication device can be easily connected to the access point.

However, when the communication parameter that is set to the access point is changed, the two-dimensional code has to be recaptured, which can be inconvenient to the user.

What is needed is a condition where, even when a communication parameter is changed after the communication parameter is set by capturing an image, the changed communication parameter can be set without recapturing the image.

SUMMARY OF THE INVENTION

Aspects of a communication device include an image capturing unit configured to capture an image, a transmission unit configured to transmit a communication parameter to connect to a wireless network established by an access point to another communication device using information obtained from the captured image, and a storage unit configured to store the information obtained from the captured image. When the communication parameter is changed after the communication parameter is transmitted to the another communication device, the transmission unit transmits the changed communication parameter to the another communication device by reusing the stored information.

Further features will become apparent from the following description of exemplary embodiments with reference to the attached drawings.

BRIEF DESCRIPTION OF THE DRAWINGS

FIG. 8 is a flowchart illustrating an operation of a smartphone according to the second embodiment.

DESCRIPTION OF THE EMBODIMENTS

First Embodiment

A communication device according to a first embodiment will be described in detail with reference to the drawings. In the following description, an example with a wireless LAN system compliant with the Institute of Electrical and Electronics Engineers, Inc. (IEEE) 802.11 series will be provided. However, the communication configuration is not limited to the wireless LAN compliant with IEEE 802.11.

Figure 3:
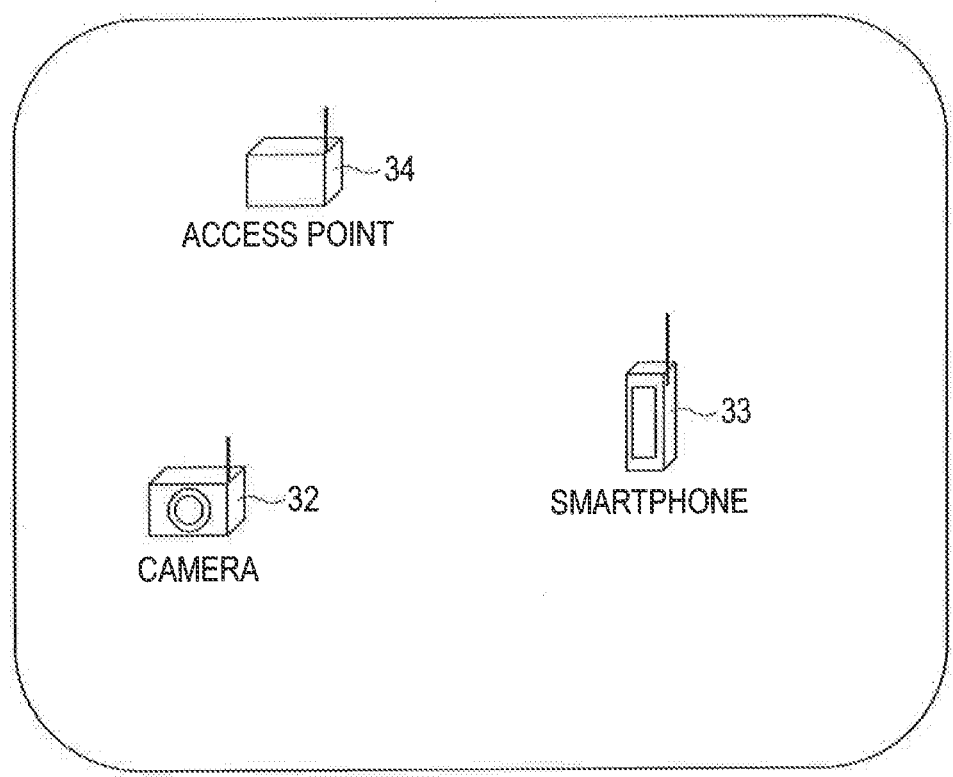
FIG. 3 is a diagram illustrating an example of a configuration of the communication system.

FIG. 3 illustrates a communication system according to the present embodiment. The communication system illustrated in FIG. 3 includes a camera 32, a smartphone 33, and an access point 34 (hereinafter, referred to as AP). A wireless network 31 is a wireless LAN established by the AP 34.

An explanation will be provided with the camera 32 and smartphone 33 as examples of communication devices in the communication system according to the present embodiment. However, the communication devices can be other communication devices, such as printers, personal computers, video cameras, smart watches, PDAs, etc.

In the present embodiment, the AP 34 operates as an AP in an infrastructure mode defined in the IEEE 802.11 standard. When connecting to the AP 34, a device other than the AP 34 operates as a station (hereinafter, referred to as STA) in the infrastructure mode defined in the IEEE 802.11 standard.

The AP 34, the camera 32, and the smartphone 33 can be connected via Wi-Fi Direct® a wireless LAN network established by the AP 34, camera 32, or smartphone 33. Wi-Fi Direct® is a communication standard defined by the Wi-Fi Alliance®. Wi-Fi Direct® defines a connection sequence starting from searching a communication partner, forming a communication group with the searched communication partner, and then performing a wireless LAN communication.

In Wi-Fi Direct®, a communication device serving as an AP of a wireless LAN is defined as a P2P group owner (hereinafter, referred to as GO) and a communication device that serves as an STA of the wireless LAN is defined as a P2P client (hereinafter, referred to as CL). In Wi-Fi Direct®, the GO serves as a base station and the CL serves as a mobile station. These roles are determined in a role determination process called. GO Negotiation specified in Wi-Fi Direct®. Each device serves as one of the determined roles to perform a wireless connection and a wireless communication between the devices. Wi-Fi Direct® includes a process for defining a plurality of roles and determining the roles, from the defined roles, for performing communication between the devices.

In Wi-Fi Direct®, a network formed by the GO is referred to as a P2P group. In the present embodiment, a group of the GO, CL, and communication device whose role has not been decided is referred to as a P2P device. When the communication device whose role is not decided loins the wireless network, its role becomes a CL, or establishes a wireless network when its role becomes a GO.

In the present embodiment, the AP 34 includes a device operable as an AP in the infrastructure mode defined in the IEEE 802.11 standard and a device operable as a GO specified in Wi-Fi Direct®. In the present disclosure, the AP and the GO are not particularly distinguished from each other, and are simply referred to as an AD.

When the devices are wirelessly connected in the infrastructure mode defined in the IEEE 802.11 standard, the STA needs to set a communication parameter of the wireless LAN established by the AP to itself and connect to the wireless LAN using the communication parameter. Similarly, when the devices are connected via Wi-Fi Direct®, a communication parameter of the wireless LAN established by the GO is provided from the GO to the CL, and the CL uses the communication parameter to connect to the wireless LAN established by the GO.

The communication parameter of the wireless LAN includes various wireless communication parameters to perform a wireless communication according to the IEEE 802.11 standard. More specifically, at least one of a Service Set Identifier (SSID) as a network identifier, an encryption scheme, an encryption key, an authentication scheme, and an authentication key is included. A MAC address, a passphrase, and an IP address for performing a communication in an IP layer or the like can also be included.

In the present embodiment, information indicating a service in an application layer provided by each communication device can be included as the communication parameter. The information indicating a service can be, for example, whether a printing function included, whether an imaging function is included, whether a file transmission and reception function included, whether a server or client function is included, etc. Information indicating a connection configuration desired by each communication device can be included as a communication parameter. Examples of a connection configuration include an infrastructure connection defined in the IEEE 802.11 standard, a direct connection by Wi-Fi Direct®, etc.

Figure 1:
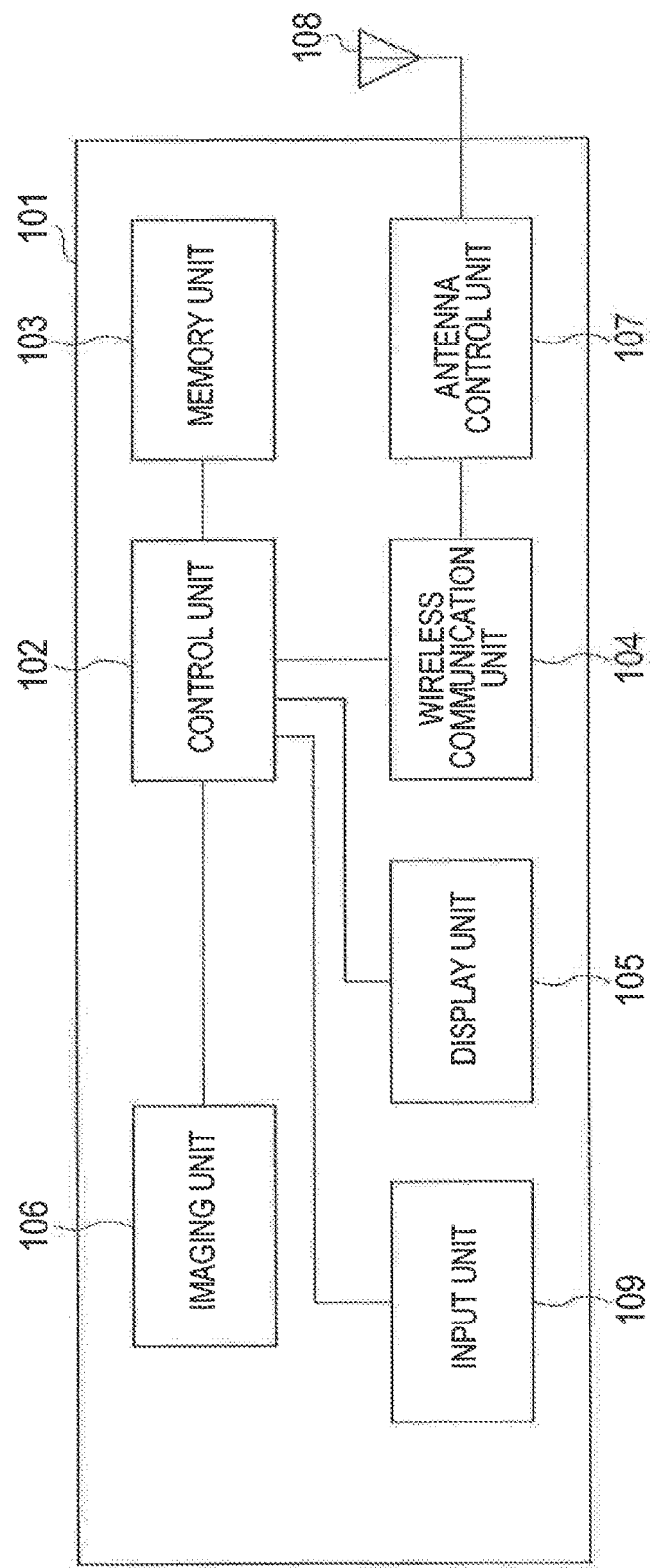
FIG. 1 is a diagram illustrating a configuration of a communication device.

Next, a hardware configuration according to the present embodiment of each communication device in the communication system illustrated in FIG. 3 will be explained with reference to FIG. 1. In FIG. 1, the reference numeral 101 represents the entire device. A control unit 102 controls the entire device by executing a control program stored in a memory unit 103. The control unit 102 is, for example, composed of a central processing unit (CPU). The memory unit 103 composed of, for example, various storage mediums such as a ROM, a RAM, an HDD, a flash memory, a detachable SD card, etc. The memory unit 103 stores various information, including a control program executed by the control unit 102, image data, a communication parameter, etc. The control unit 102 performs operations, described below, by executing the control program stored in the memory unit 103.

A wireless communication unit 104 performs a wireless LAN communication according to the IEEE 802.11 series. The wireless communication unit 104 is composed of a chip that performs a wireless communication. A display unit 105 outputs at least one of visual information and sound information. The display unit 105 includes a Video RAM (VRAM) that stores image date corresponding to the visual information to be displayed. The display unit 105 performs a display control to display the image data stored in the VRAM on an LCD, LED, etc.

An imaging unit 106 is composed of an image pickup element, a lens or the like, and captures still images and moving images. The imaging unit 106 can read, for example, code information, such as a one-dimensional barcode, a two-dimensional code including a QR Code® or the like. An antenna control unit 107 controls an output of an antenna 108, where the antenna 108 is an antenna communicates in a 2.4 GHz band and/or a 5 GHz band via the wireless LAN. An input unit 109 enables a user to perform various inputs and to operate the communication device 101. The input unit 109 stores a flag, which corresponds to the input, in a memory such as the memory unit 103.

Figure 2:
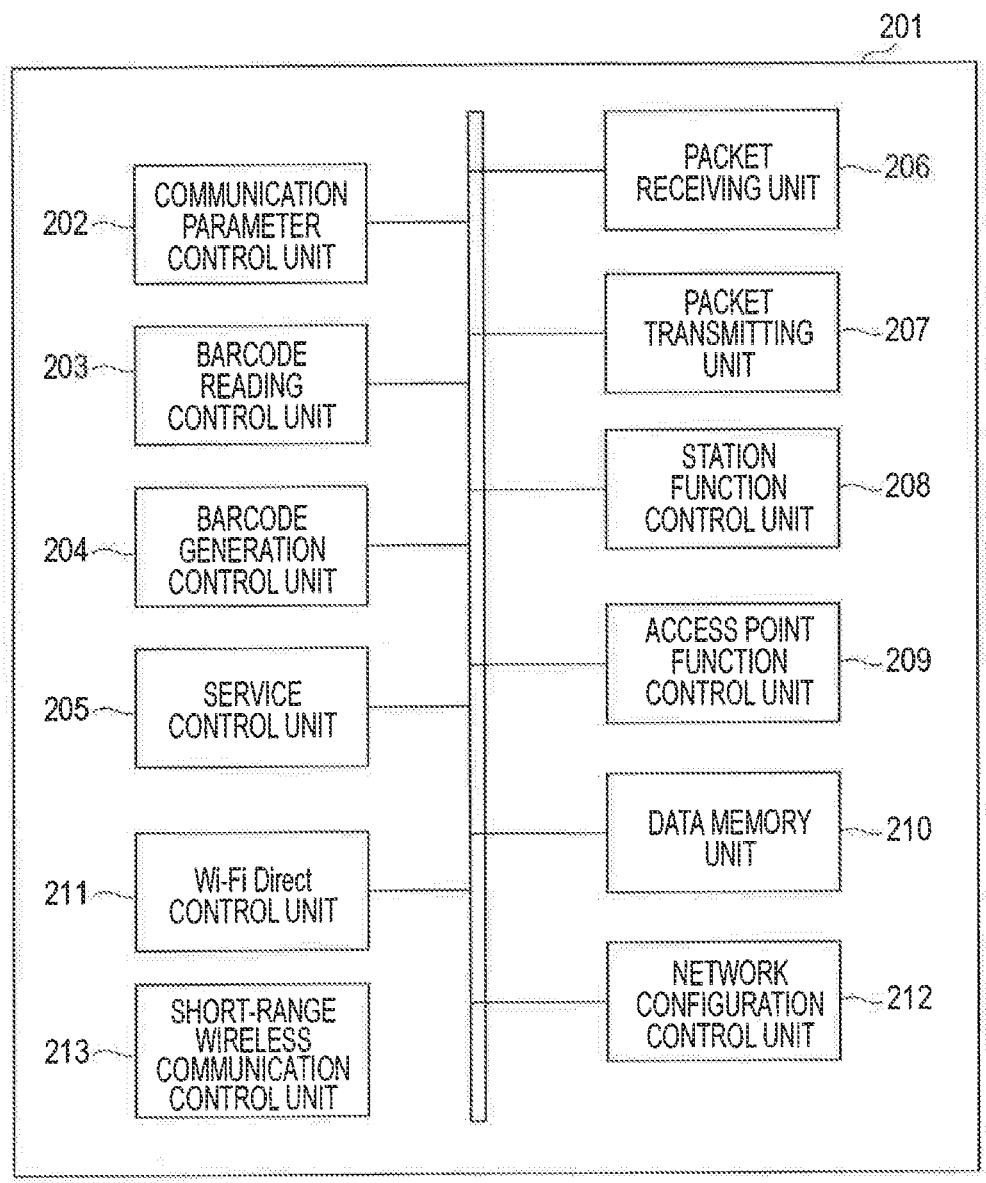
FIG. 2 is a diagram illustrating a software functional configuration of the communication device.

FIG. 2 is a block diagram illustrating an example of a software function block configuration for executing communication control functions described below. According to the present embodiment, when function blocks of the devices are respectively stored as a program in the memory unit 103 and the control unit 102 executes the programs, the functions are performed. The control unit 102 realizes the respective functions by controlling hardware elements and calculating or processes information according to a control program. Part of or all of the function blocks can be provided as hardware. For example, a part of or all of the respective function blocks are composed of an Application Specific Integrated Circuit (ASIC).

In FIG. 2, reference numeral 201 indicates an entire software function block. Reference numeral 202 is a communication parameter control unit. The communication parameter control unit 202 executes a communication parameter setting process for sharing a communication parameter between devices. In the communication parameter setting process, a providing device provides a communication parameter for performing a wireless communication to a receiving device. The communication parameter setting process performed by the communication parameter control unit 202 can be Wi-Fi Protected Setup™ (WPS) defined by the Wi-Fi Alliance®. The communication parameter setting process performed by the communication parameter control unit 202 can be a scheme for securely transferring a communication parameter by using a public key encryption.

The reference numeral 203 is a barcode reading control unit. The barcode reading control unit 203 analyzes an image captured by the imaging unit 106 and acquires encoded code information. The barcode reading control unit 203 performs an analyzing process of code information including a barcode, a two-dimensional code such as a QR Code® or the like.

The reference numeral 204 is a barcode generation control unit. The barcode generation control unit 204 generates code information including a barcode and a two-dimensional code such as a QR Code® or the like, and controls displaying the generated code information on the display unit 105. The generated code information includes encoded information needed for setting the communication parameter.

The reference numeral 205 is a service control unit in an application layer. The application layer is a service provision layer in an upper layer that is Layer 5 or upper of PSI reference model. The service control unit 205 performs a printing process, an image streaming process, a file transfer process and the like via a wireless communication performed by the wireless communication unit 104.

A packet receiving unit 206 and a packet transmitting unit 207 control reception and transmission of various packets, including communication protocols in the upper layers. The packet receiving unit 206 and the packet transmitting unit 207 control the wireless communication unit 104 to transmit and receive packets compliant with the IEEE 802.11 standard to and from other devices.

A station function control unit 208 provides an STA function to operate as an STA in the infrastructure mode defined in the IEEE 802.11 standard. The STA function control unit 208 performs authentication and encryption processing or the like when operating as an STA. An access point function control unit 209 provides an AP function to operate as an AP in the infrastructure mode defined in the IEEE 802.11 standard. The AP function control unit 209 forms a wireless network and performs authentication and encryption processing on the STA, management of the STA, etc.

A data memory unit 210 controls writing and reading of the software, the communication parameter, code information, or the like to and from the memory unit 103. A Wi-Fi Direct® control unit 211 performs various processes according to the Wi-Fi Direct®. The Wi-Fi Direct® control unit 211 serves as an AP under the control of the AP function control unit 209 when operating as the GO, and serves as an STA under the control of the STA function control unit 208 when operating as the CL. A short-range wireless communication control unit. 213 controls short-range wireless communication, such as Near Field Communication (NFC), Bluetooth®, etc.

The above described function block is one example. A plurality of function blocks can compose the function block or one of the function blocks can be divided into blocks that perform a plurality of functions.

The present embodiment describes a case where the camera 32 and the smartphone 33 perform a communication parameter setting process using a QR Code®. After a communication parameter of a wireless LAN established by the AP 34 is set, the communication parameter is changed. More particularly, the present embodiment describes a case where the communication parameter of the wireless LAN is changed in response to an instruction from the smartphone 33.

Figure 4:
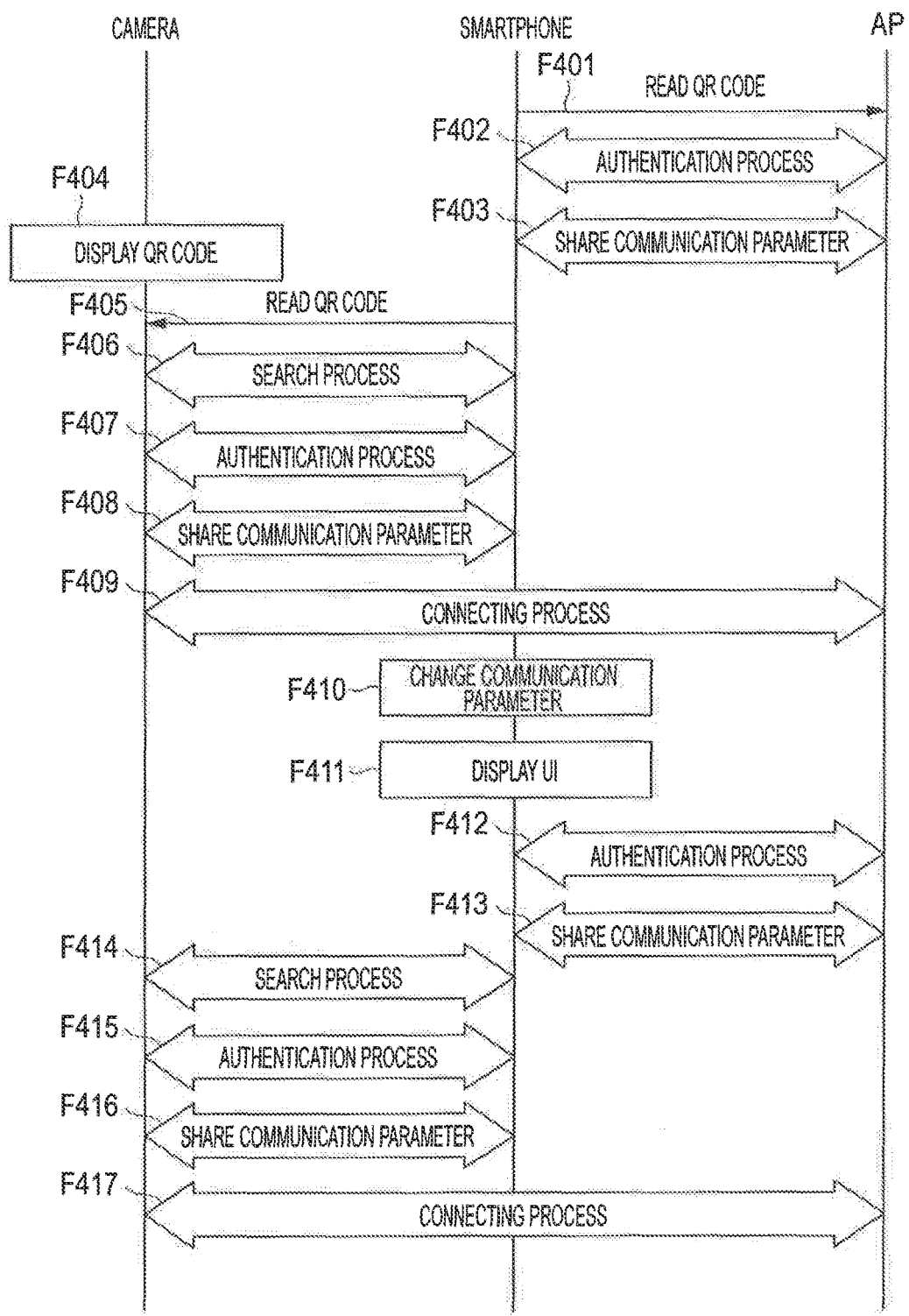
FIG. 4 is a diagram illustrating an example of a sequence in a communication system according to a first embodiment.

FIG. 4 is a sequence diagram illustrating the communication parameter setting process and a connecting process using a QR Code®, which are executed by the camera 32, the smartphone 33, and the AP 34.

In FIG. 4 when a start of a communication parameter setting process is instructed, the smartphone 33 activates the imaging unit 106 and captures an image of the QR Code® of the AP 34. The barcode reading control unit 203 of the smartphone 33 then analyzes the captured image and acquires encoded code information (F401). The QR Code® of the AP 34 can be written on a label attached to the AP 34 or, can be displayed by the AP 34.

The QR Code® includes information needed for setting the communication parameter. The information needed for setting the communication parameter is, for example, information used when transmitting the communication parameter in an encrypted communication or device identification information. The information used when transmitting the communication parameter in an encrypted communication can be a public key or a certificate. The device identification information is information that can uniquely identify a device, such as a MAC address or a UUID.

The information needed for setting the communication parameter can be an identifier indicating the communication parameter setting process. The smartphone 33 decodes the read QR Code® and acquires a public key of the AP 34 or identification information, as the information indicated by the QR Code®. The smartphone 33 uses the wireless communication unit 104 to perform an authentication process with the AP 34 based on the information read from the QR Code® (F402).

When the authentication succeeds, the AP 34 transmits the communication parameter of the wireless LAN established by the AP 34 to the smart hone 33. This enables the communication parameter of the wireless LAN established by the AP 34 to be set to the smartphone 33. The smartphone 33 stores information acquired from the QR Code® of the AP 34, i.e., the above described information needed for setting the communication parameter to the memory unit 103.

Next, the camera 32 displays the QR Code® on the display unit 105 (F404). The QR Code® includes the information needed for setting the communication parameter, such as a public key, identification information of the camera 32, etc. The smartphone 33 captures the image of the QR Code® of the camera 32 using the imaging unit 106, and the barcode reading control unit 203 analyzes the image captured by the imaging unit 106 and obtains encoded code information (F405).

The smartphone 33 decodes the read QR Code® and acquires information indicated by the QR Code®. The smartphone 33, using the wireless communication unit 104, performs a search process and an authentication process based on the information obtained from the QR Code® (F406, F407). The smartphone 33, as part of the search process, can transmit a search signal specifying the identification information of the camera 32 obtained by capturing the image of the QR Code®. The search signal can be, for example, a Probe Request defined in the IEEE 802.11 standard.

The smartphone 33 transmits the communication parameter acquired from the AP 34 in F403 to the camera 32 (F408). The camera 32 and the AP 34 perform a wireless connection using the wireless communication unit. 104 based on the communication parameter shared via the smartphone 33 (F409). The smartphone 33 stores the information obtained from the QR Code® of the camera 32 in the memory unit 103.

Next, the smartphone 33 receives an instruction, which is input by a user via the input unit 109, to change the communication parameter of the wireless LAN established by the AP 34 (F410). When the user instructs changing the communication parameter of the wireless LAN, there can be, for example, a case that the encrypted communication setting included in the communication parameter is changed to improve the security strength of the wireless LAN. Or, there can be a case that an SSID, which is network identification information, is changed to reestablish the wireless LAN to communicate only with some of the communication devices connected to the wireless LAN established by the AP 34.

When an instruction to change the communication parameter is given in F410, the smartphone 33 displays, on the display unit 105, a display to prompt the user whether to reuse the information obtained from the QR Code®, which is read in F401 and F405 (F411). When instructed to reuse the information that is already obtained from the QR Code®, the smartphone 33 reads, from the memory unit 103, information obtained from the QR Code® of the AP 34 and performs an authentication process, based on the information, with the AP 34 using the wireless communication unit 104 (F412). When the authentication succeeds, the smartphone 33 notifies the AP 34 of a change request of the communication parameter. Then, the smartphone 33 acquires the changed communication parameter from the AP 34 (F413).

When the information obtained from the QR Code® that is read in F405 is reused, the smartphone 33 reads the information obtained from the QR Code® of the camera 32 from the memory unit 103. Then, based on the information, the smartphone 33 searches for the camera 32 using the wireless communication unit 104, and performs an authentication process (F414, F415). When the authentication succeeds, the smartphone 33 transmits the new communication parameter obtained from the AP 34 in F413 to the camera 32 (F416). The camera 32 and the AP 34 perform, based on the new communication parameter, wireless connection again using the wireless communication unit 104 (F417).

According to the sequence of FIG. 4, the smartphone 33 transmits the changed communication parameter to the camera 32. However, a wireless LAN can be reestablished and the changed communication parameter can be transmitted only to devices that desire to be continuously connected. The smartphone 33, in F411, displays a list of partner devices to which the communication parameter has previously been transmitted and a device as a target of reusing the information previously obtained from the QR Codes® can be selected.

Figure 5:
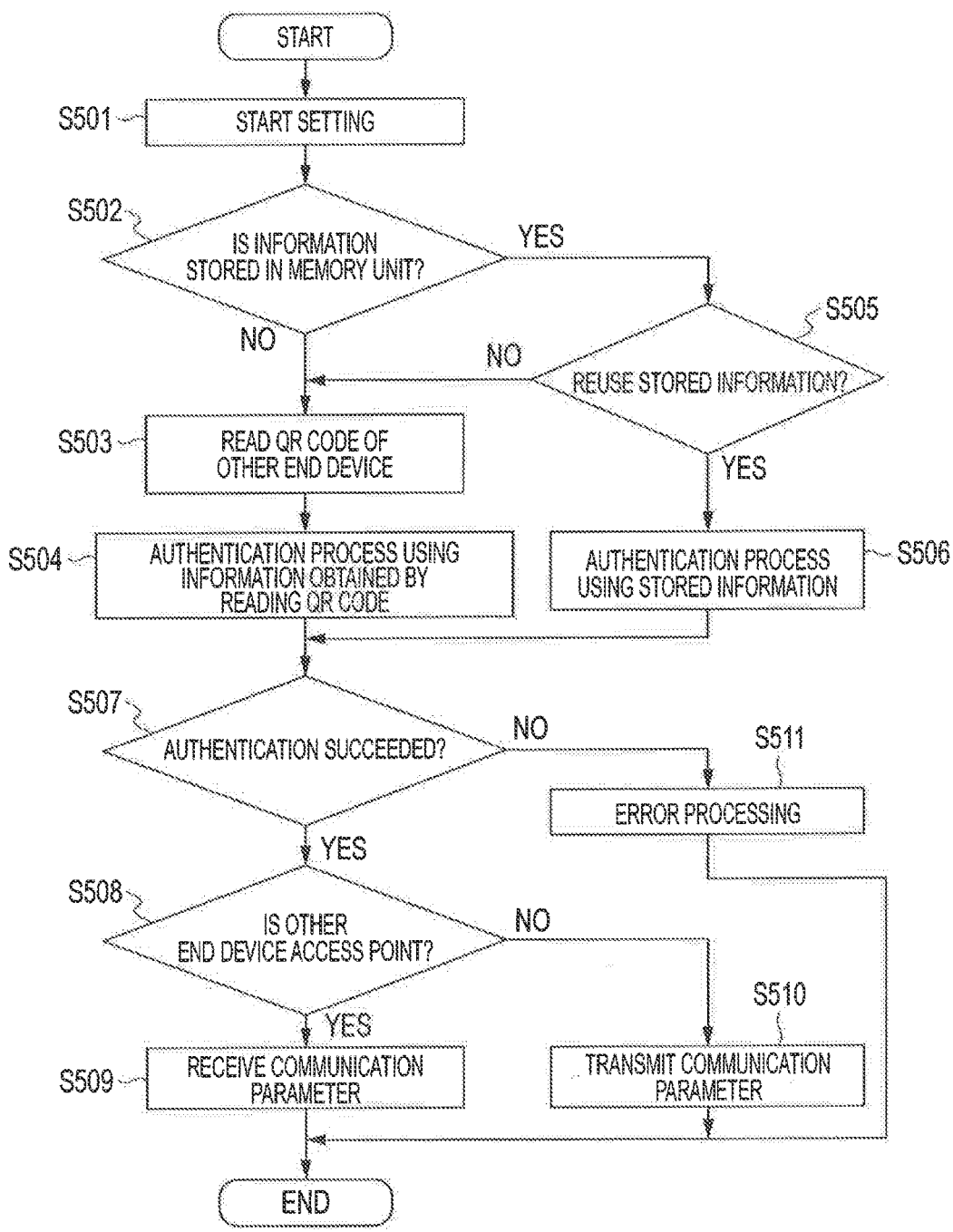
FIG. 5 is a flowchart illustrating an operation of a smartphone according to the first embodiment.

FIG. 5 is a flowchart illustrating a process executed in the smartphone 33 according to the present embodiment. Each step in FIG. 5 is performed by the smartphone's 33 control unit 102 reading and executing the computer program stored in the memory unit 103. In another embodiment, a configuration where hardware, such as an ASIC for example, can realize a part of or all of the steps in the flowchart illustrated in FIG. 5.

First, the smartphone 33 accepts an instruction to start a communication parameter setting process (S501). The instruction to start the communication parameter setting process is, for example, provided by a user via the input unit 109. Next, the smartphone 33 determines whether the information obtained by reading the QR Code®, that is, the information needed for setting a communication parameter, e.g., a public key, device identification information, etc., is stored in the memory unit 103 (S502).

The smartphone 33 proceeds to S503 when the information is not stored in the memory unit 103 (S502, no) and proceeds to S505 when the information is stored (S502, yes). When the information needed for setting the communication parameter is not stored (S502, no), the smartphone 33 captures the image of the QR Code® of the other end device using the imaging unit 106 (S503). Then, the smartphone 33 analyzes the captured QR Code® and obtains the information indicated by the QR Code®.

The smartphone 33, using the wireless communication unit 104, performs a search process and an authentication process based on the information obtained from the QR Code® (S504). As described above, in the search process, a search signal can be transmitted that specifies the identification information obtained from the QR Code®.

When the information needed for setting the communication parameter, e.g., a public key, device identification information, etc., is stored in the memory unit 103 (S502, yes), the smartphone 33 determines whether to reuse the information (S505). A display to prompt the user whether to reuse the information is displayed and the determination is made according to the user's selection. The smartphone 33 proceeds to a process in S503 when the stored information is not reused (S505, no), and proceeds to a process in S506 when the information reused (S505, yes) (S505).

In S506, the smartphone 33 reads the information stored in the memory unit 103 and performs a search process and an authentication based on the information. After the process in S504 or S506 is performed, the smartphone 33 determines whether the authentication process with the other end device succeeds (S507). The smartphone 33 proceeds to a process in S508 when the authentication process with the other end device succeeds (S507, yes) and proceeds to a process in S511 when the authentication process fails (S507, no).

When the authentication process with the other end device succeeds (S507, yes), the smartphone 33 determines whether the other end device is an AP (S508). The determination whether the other end device is an AP based on, for example, a content of a predetermined message signal obtained from the other end device or whether there is a beacon signal. The smartphone 33 proceeds to a process in S509 when the other end device is an AP (S508, yes) and proceeds to a process in S510 when the other end device is not an AP (S508, no).

When the other end device is an AP (S508, yes), the smartphone 33 receives, from the other end device, a communication parameter of the wireless LAN established by the other end device (S509). In this case, the smartphone 33 can request the AP as the other end device to change the communication parameter and receive a changed communication parameter. When the other end device is not an AP (S508, no), the smartphone 33 transmits a communication parameter of the wireless LAN established by the AP to the other end device (S509). When the authentication process with the other end device fails (S507, no), the smartphone 33 performs error processing and displays the content of the error on the display unit 105 (S511).

As described above, according to the present embodiment, when the communication parameter is set by capturing an image of a two-dimensional code or the like, information obtained from the captured image is stored. Then, when the communication parameter is changed and the changed communication parameter is set, the stored information is reused to set the changed communication parameter. With this configuration, the work to recapture the image can be omitted, reducing a user's operation load.

Second Embodiment

The first embodiment described a case where the communication parameter of the wireless LAN is changed according to an instruction from the smartphone 33. A second embodiment will row be provided where the communication parameter of the wireless LAN is changed according to an instruction from the camera 32 or by the AP 34 itself. Since the descriptions of FIGS. 1 to 3 are the same in the present embodiment as those in the first embodiment, the descriptions thereof is omitted.

Figure 6:
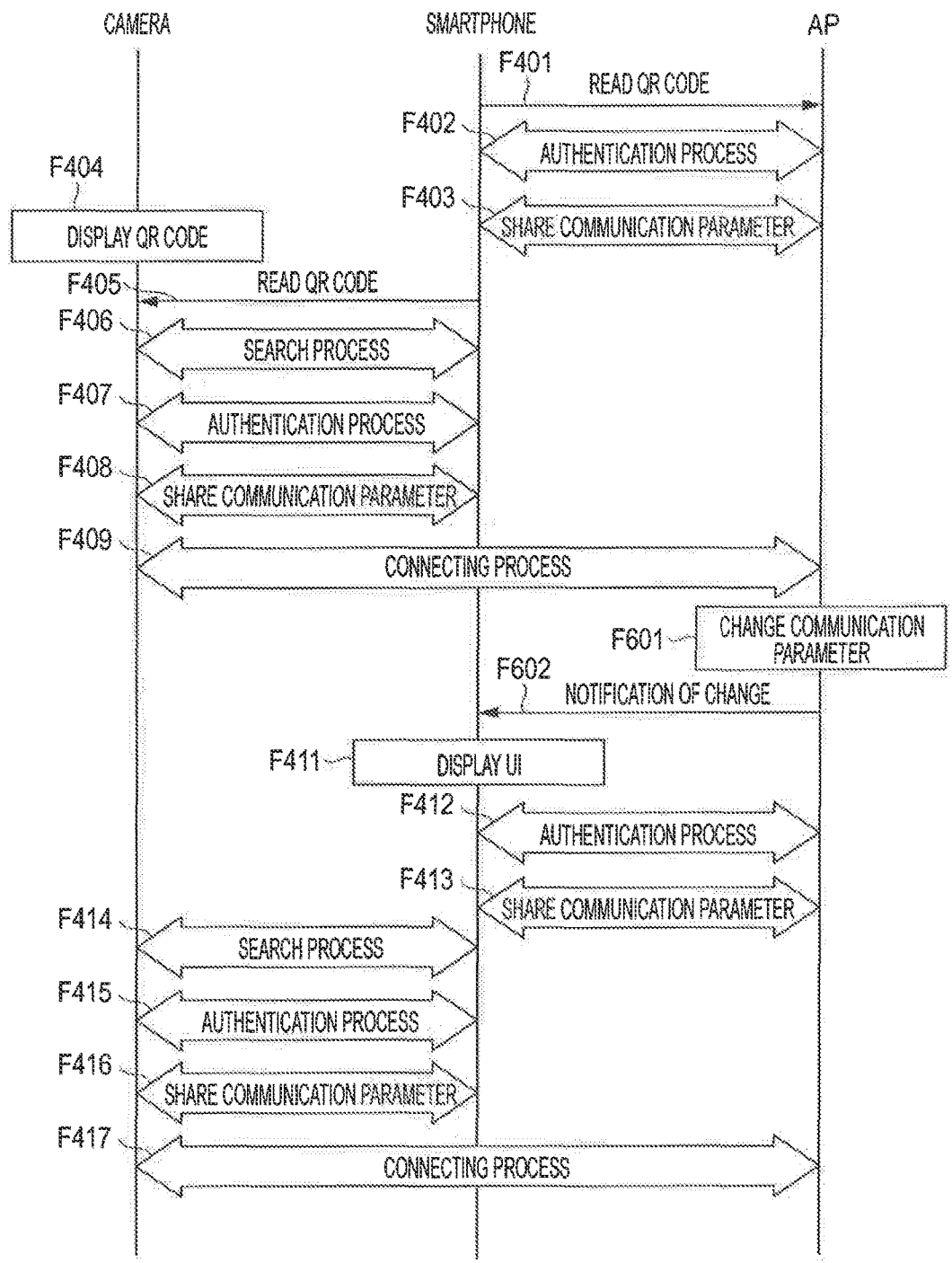
FIG. 6 is a diagram illustrating an example of a sequence in a communication system according to a second embodiment.

FIG. 6 illustrates a sequence diagram of a case where the AP 34 changes the communication parameter of the wireless LAN. Since the processes from F401 to F409 are the same as those in the first embodiment, the descriptions thereof are omitted.

In FIG. 6, the AP 34 accepts an instruction to change the communication parameter of the wireless LAN established by the AP 34 from a user operating a WEB UI or the like (F601). Next, the AP 34 notifies the smartphone 33 that the communication parameter is to be changed. The change notification is performed using a wireless LAN packet when the smartphone 33 is on the same network as the AP 34, and is performed using, for example, a Public Action frame when the smartphone 33 is not on the same network. Information of a device that desires to reestablish the network, that is, information of a device allowed as a notification destination of the changed communication parameter, can be attached to the change notification. The smartphone 33 receives a change notification transmitted from the AP 34 via the packet receiving unit 206 (F602). Since the sequence to change the communication parameter thereafter is the same as the sequence from F411 to F417 of the first embodiment, the description thereof is omitted.

Figure 7:
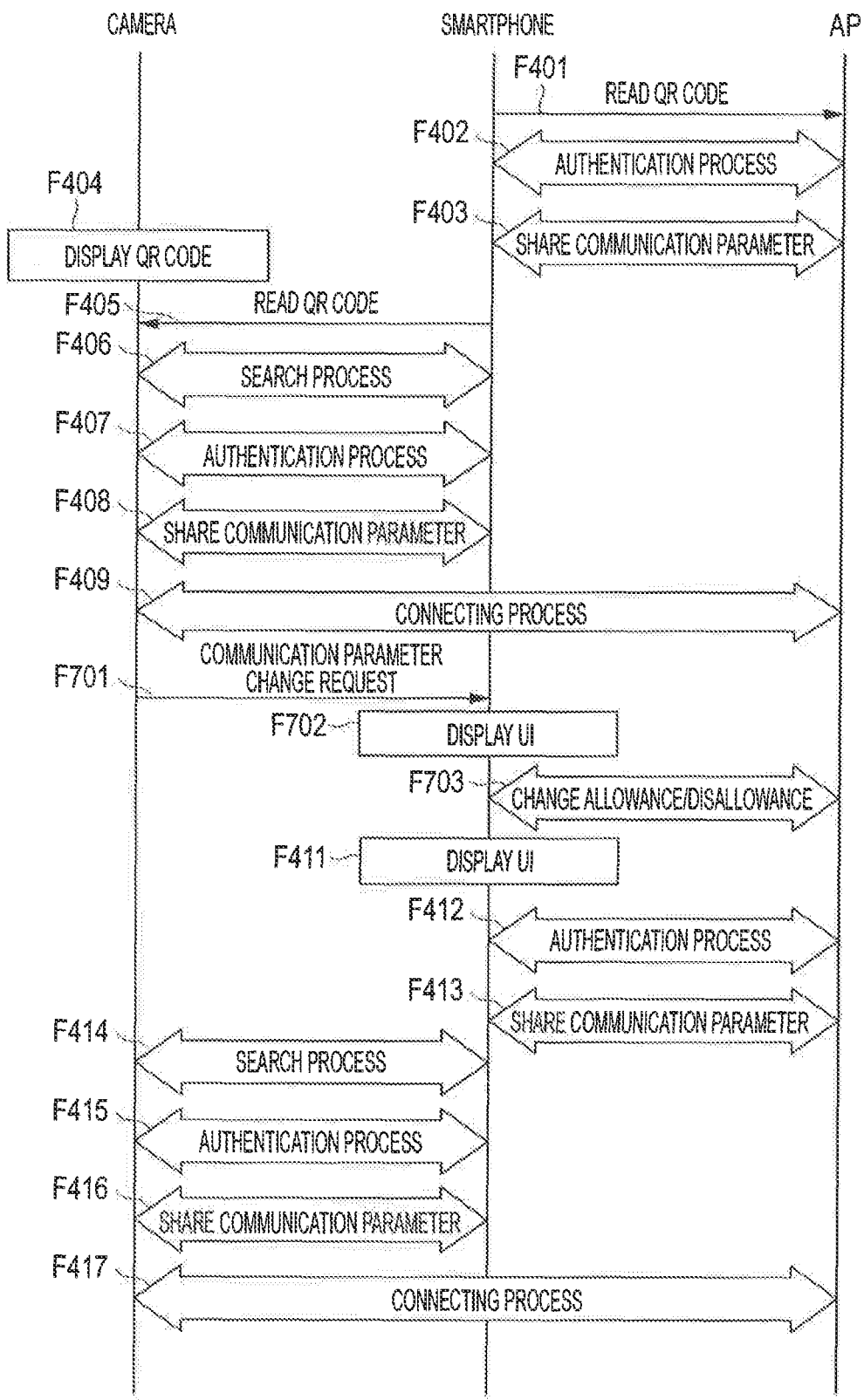
FIG. 7 is a diagram illustrating an example of a sequence in the communication system according to the second embodiment.

FIG. 7 illustrates a sequence diagram in a case where the communication parameter of the wireless LAN is changed according to an instruction from the camera 32. Since the sequence from F401 to F409 is the same as that of the first embodiment, the description thereof is omitted.

In FIG. 7, the camera 32 transmits a request to change the communication parameter of the wireless LAN to the smartphone 33 in response to accepting an instruction to change the communication parameter from the user using the input unit 109 (F701). This change request is notified using a wireless LAN packet when the camera 32 is on the same network as the smartphone 33 and is notified by using a Public Action frame when the camera 32 is not on the same network. Information of a device that desires to reestablish the network, that is, information of a device allowed as a notification destination of the changed communication parameter, can be attached to the change request.

Upon receiving the change request transmitted from the camera 32, the smartphone 33 displays a display prompting the user whether to change the communication parameter of the wireless LAN established by the AP 34 (F702). When the user enables changing the communication parameter, the smartphone 33 inquires of the AP 34, via the wireless communication unit 104, whether the communication parameter is changeable (F703). When the communication parameter changeable, since the sequence thereafter is the same as that from F411 to F417 of the first embodiment, the description thereof is omitted. When the user does not enable changing the communication parameter in F702, or when the AP 34 does not allow to change the communication parameter in F703, the smartphone 33 notifies the camera 32 that the communication parameter cannot be changed.

FIG. 8 is a flowchart illustrating a process executed by the smartphone 33 according to the present embodiment. Each step of FIG. 8 performed by the smartphone's 33 control unit 102 reading and executing the computer program stored in the memory unit 103. In another embodiment, a part of or all of the steps of the flowchart illustrated in FIG. 8 can be realized by hardware such as an ASIC or the like.

The smartphone 33 determines whether a request to change the communication parameter of the wireless LAN is received from the other end device (S801). The smartphone 33 proceeds to S802 when the change request is received (S801, yes), and returns to S801 when the change request is not received (S801, no). When the change request is received (S801, yes), the smartphone 33 determines whether the other end device that is the sender of the change request is an AP.

The smartphone 33 proceeds to S505 of FIG. 5 when the sender of the change request is the AP (S802, yes), and proceeds to S803 when the sender of the change request is not the AP (S802, no). Since the process in S505 and thereafter is the same as that described above in the first embodiment with respect to FIG. 5, the description thereof is omitted.

Next, the smartphone 33 determines whether to enable the change of the communication parameter of the wireless LAN (S803). A display prompting the user whether to allow the change is displayed and the determination is made according to the user's selection. The smartphone 33 proceeds to S804 when the change of the communication parameter is allowed (S803, yes), and proceeds to S806 when the change is not allowed (S803, no).

When the change of the communication parameter is allowed (S803, yes), the smartphone 33 inquires, via the wireless communication unit 104, of the AP 34 whether the communication parameter is changeable (S804). Next, the smartphone 33 receives change allowance/disallowance information from the AP 34 and determines the change allowance/disallowance based on the content (S805). The smartphone 33 proceeds S505 of FIG. 5 when the notification that the communication parameter is changeable is sent from the AP 34 (S805, yes) and proceeds to S806 when the notification that the communication parameter is not changeable is sent from the AP 34 (S805, no). Since the process in S505 and thereafter is the same as that of FIG. 5 according to the first embodiment, the description thereof is omitted. When the user does not enable changing the communication parameter in S803 or when the AP 34 does not allow changing the communication parameter in S805, the smartphone 33 notifies the camera 32, via the wireless communication unit 104, that the communication parameter cannot be changed.

As described above, according to the present embodiment, when communication parameter is set by capturing an image of a two-dimensional code or the like, information obtained from the captured image is stored. Then, in a case where a communication parameter is changed and the changed communication parameter is set, the changed communication parameter is set by reusing the stored data. With this configuration, the work to recapture the image can be omitted, thus reducing the user's operation load.

Other Embodiments

The above embodiments have described a configuration to exchange information to set a communication parameter using an image of a QR Code® between devices. However, a wireless communication such as an NFC, Bluetooth® or the like can be used as substitute for image capturing of a QR Code®. A wireless communication, such as IEEE 802.11ad, TransferJet® or the like, can also be used.

The QR Code® to be read can be printed in or attached to an operation manual of a device or printed on or attached to a packing material of a device. The above-described embodiments are not limited to the use of a QR Code®. Any type of one-dimensional barcode or two-dimensional code other than a QR Code® can be used. In another embodiment, instead of information being provided in a machine-readable format, such as a QR Code®, the information can be provided in a user-readable format.

Each of the above-described embodiments has discussed communication between devices being performed with a wireless LAN communication compliant with the IEEE 802.11 standard. The communication however, is not limited to this method, and can be performed using other wireless communication mediums such as wireless USB, Multi Band OF DM Alliance (MBOA), Bluetooth®, UWB (e.g., wireless USB, wireless 1394, WINET, etc.), ZigBee, NFC or the like.

The above-described embodiments have discussed an example where a smartphone captures an image of a QR Code® of an AP dedicated device serving as an external device, obtains a communication parameter from the AP, and transmits the communication parameter to a camera. The communication parameter transmitted from the smartphone to the camera does not necessarily need to be a communication parameter obtained from the AP dedicated device serving as an external device of the smartphone. A communication parameter of a wireless LAN established by the smartphone operating as an AP can be used. In this case, the smartphone operates as, for example, a GO of Wi-Fi Direct®.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-012866, filed Jan. 26, 2016, which is hereby incorporated by reference herein in its entirety.

What is claimed is:

1. A communication device, comprising:
    at least one processor; and
    at least one memory storing a program to be executed by the at least one processor, wherein the at least one processor executes the program to function as:
    an image capturing unit configured to capture an image;
    a storage unit configured to store the information obtained from the captured image;
    a display unit configured to present a display to prompt a user whether to reuse the stored information; and
    a determination unit configured to determine whether to reuse the stored information based on a user's response,
    wherein, when the communication parameter is changed after the communication parameter is transmitted to the another communication device and the determination unit determines to reuse the information, the transmission unit transmits the changed communication parameter to the another communication device by reusing the stored information.

2. The communication device according to claim 1, wherein when the determination unit determines not to reuse the information, the transmission unit transmits the changed communication parameter to the another communication device using information obtained by recapturing the image by the image capturing unit.

3. The communication device according to claim 1, wherein the captured image is an image displayed on a display unit of the another a communication device.

4. The communication device according to claim 1, wherein the information obtained from the captured image includes a public key used in an encrypted communication.

5. The communication device according to claim 4, wherein the transmission unit transmits the communication parameter, which is encrypted with the public key, to the another communication device.

6. The communication device according to claim 1, wherein the access point is a device different from the communication device and the another communication device.

7. The communication device according to claim 1, further comprising a reception unit configured to receive a change notification of the communication parameter from the access point.

8. The communication device according to claim 1, wherein the communication parameter includes at least an SSID, an encryption key, an encryption scheme, an authentication key, or an authentication scheme.

9. The communication device according to claim 1, wherein the communication parameter includes at least an SSID, an encryption key, an encryption scheme, an authentication key, or an authentication scheme.

10. The communication device according to claim 1, wherein the image is a barcode or a two-dimensional code.

11. A communication device, comprising:
    at least one processor; and
    at least one memory storing a program to be executed by the at least one processor, wherein the at least one processor executed the program to function as:
    an image capturing unit configured to capture an image;
    a transmission unit configured to transmit a communication parameter to connect to a wireless network established by an access point, to another communication device using information obtained from the captured image;
    a storage unit configured to store the information obtained from the captured image;
    an instruction unit configured to instruct to change the communication parameter; and
    a notification unit configured to notify a change request of the communication parameter to the access point when the instruction unit instructs to change the communication parameter,
    wherein, when the communication parameter is changed after the communication parameter is transmitted to the another communication device, the transmission unit transmits the changed communication parameter to the another communication device by reusing the stored information.

12. The communication device according to claim 11, wherein the captured image is an image displayed on a display unit of the another communication device.

13. The communication device according to claim 11, wherein the information obtained from the captured image includes a public key used in an encrypted communication.

14. The communication device according to claim 13, wherein the transmission unit transmits the communication parameter, which is encrypted with the public key, to the another communication device.

15. The communication device according to claim 11, wherein the access point is a device different from the communication device and the another communication device.

16. The communication device according to claim 11, further comprising a reception unit configured to receive a change notification of the communication parameter from the access point.

17. The communication device according to claim 11, wherein the wireless network is a wireless LAN compliant with IEEE 802.11.

18. The communication device according to claim 11, wherein the communication parameter includes at least an SSID, an encryption key, an encryption scheme, an authentication key, or an authentication scheme.

19. The communication device according to claim 11, wherein the image is a barcode or a two-dimensional code.

20. A communication method comprising:
   transmitting a communication parameter to connect to a wireless network established by an access point, to another communication device using information obtained from a captured image; and
   storing the information obtained from the captured image,
   presenting a display to prompt a user whether to reuse the stored information; and
   determining whether to reuse the stored information based on a user's response,
   wherein, when the communication parameter is changed after the communication parameter is transmitted to the another communication device and a determination has been made to reuse the stored information, the changed communication parameter is transmitted to the another communication device by reusing the stored information.

21. A non-transitory computer-readable storage medium storing computer executable instructions that cause a communication device to execute a process, the process comprising:
   transmitting a communication parameter to connect to a wireless network established by an access point, to another communication device using information obtained from a captured image; and
   storing the information obtained from the captured image,
   presenting a display to prompt a user whether to reuse the stored information; and
   determining whether to reuse the stored information based on a user's response,
   wherein, when the communication parameter is changed after the communication parameter is transmitted to the another communication device and a determination has been made to reuse the stored information, the changed communication parameter is transmitted to the another communication device by reusing the stored information.

22. A communication method comprising:
   capturing an image;
   transmitting a communication parameter to connect to a wireless network established by an access point, to another communication device using information obtained from the captured image;
   storing the information obtained from the captured image;
   instructing to change the communication parameter; and
   notifying a change request of the communication parameter to the access pint when the instruction unit instructs an instruction to change the communication parameter has been made,
   wherein, when the communication parameter is changed after the communication parameter is transmitted to the another communication device, the changed communication parameter is transmitted to the another communication device by reusing the stored information.

23. A non-transitory computer-readable storage medium storing computer executable instructions that cause a communication device to execute a process, the processing comprising:
   capturing an image;
   transmitting a communication parameter to connect to a wireless network established by an access point, to another communication device using information obtained from the captured image;
   storing the information obtained from the captured image;
   instructing to change the communication parameter; and
   notifying a change request of the communication parameter to the access point when the instruction unit instructs an instruction to change the communication parameter has been made,
   wherein, when the communication parameter is changed after the communication parameter is transmitted to the another communication device, the transmission unit transmits the changed communication parameter is transmitted to the another communication device by reusing the stored information.

* * * * *